United States Patent [19]

Galter

[11] 4,041,821
[45] Aug. 16, 1977

[54] SCRAP SHEARING MACHINE

[75] Inventor: Hellmut Galter, Salzkotten, Germany

[73] Assignee: Lindemann Maschinenfabrik GmbH, Dusseldorf, Germany

[21] Appl. No.: 723,212

[22] Filed: Sept. 14, 1976

[30] Foreign Application Priority Data

Sept. 26, 1975 Germany .............................. 2542909

[51] Int. Cl.² .............................................. B26D 11/00
[52] U.S. Cl. ........................................ 83/382; 83/456; 83/390; 83/519; 83/639; 83/694
[58] Field of Search ................ 83/382, 390, 456, 519, 83/636, 694, 639

[56] References Cited

U.S. PATENT DOCUMENTS

| | | | |
|---|---|---|---|
| 3,039,343 | 6/1962 | Richards | 83/694 X |
| 3,240,094 | 3/1966 | Van Endert | 83/636 |

*Primary Examiner*—Willie G. Abercrombie
*Attorney, Agent, or Firm*—Toren, McGeady and Stanger

[57] ABSTRACT

A scrap shearing machine suitable for cutting up plate-like scrap material comprises two pairs of knives each pair of which consists of a movable knife and a stationary knife. The pairs are arranged to cut the scrap material successively and the knives of one pair are set to cut in a plane which lies at an angle of preferably at least 30° to the plane of cut of the knives of the other pair. The movable knives are carried on supports which are arranged counter to each other and are movable independently of each other and inlet and outlet openings are provided in a housing within which the knives operate. The inlet opening which is for the scrap material to be cut and the outlet opening which is for the cut pieces of scrap are aligned with each other, one opening being on one side of the cutting plane of one pair of knives and the other opening being on the remote side of the cutting plane of the other pair of knives. Further, the knife supports are constructed as rams and are arranged to clamp the scrap material between them during cutting.

2 Claims, 6 Drawing Figures

SCRAP SHEARING MACHINE

If sheared pieces of scrap which do not exceed specific dimensions are to be produced by scrap shearing machines from plate-like material, and if the material to be sheared comprises pieces of relatively large dimensions, then the necessary size is frequently achieved only with two cuts, the cutting planes of which are at an angle to each other, in the simplest case at right angles to one another. This is achieved, for instance, in the scrap shearing machine described in German Patent Specification 1,229,390 by an arrangement of two cutting shears located one behind the other and these shears make the required cuts in succession. In this machine, the dimensions of the pieces of scrap produced as the end product can readily be adjusted as desired. As a rule, however, both shears must be equipped with a holding-down device for holding down the scrap as it is cut. Furthermore, the material cut in the first shears must be turned round to feed it into the second shears. All this implies complication, so that under certain circumstances it is frequently better to mount shearing machines separately from one another.

In the shearing machine for cutting up non-metallic scrap described in German Patent Specification 1,552,637, the two-way cutting operation is effected without two cutting shears arranged one behind the other. Here however the disadvantage must be accepted that the dimensions of the pieces produced by cutting cannot be changed, without changing the cutting tools of the machine.

The aim of the present invention is to provide a scrap shearing machine which is suitable for cutting up plate-like scrap material and with which it is possible, without changing the cutting tools, to alter the sizes of the pieces produced by cutting in one dimension. The invention makes use of the fact that when cutting plate-like material one of the three dimensions of the cut pieces in the great majority of cases is already determined by the dimensions of the material being cut. Plate-like material is to be understood as meaning not only regular plates, but also uneven plates such as ships plates or castings, such as are produced amongst other things when breaking up old ingot moulds. When relatively large cutting strokes are used, shearing machines in accordance with the invention can also be employed however for processing material which is not initially plate-like but which has to be squashed before the first cut. This applies, amongst other things, to many kinds of hollow sheet objects, such as scrap industrial products such as refrigerators, domestic ovens and the like.

The scrap shearing machine in accordance with the invention comprises two pairs of knives, each pair of which consists of a movable knife and of a stationary knife, the two pairs being arranged to cut the scrap material successively and the knives of one pair being set to cut in a plane which lies at an angle to the plane of cut of the knives of the other pair as disclosed in German Patent Specification 1,229,390. In the machine in accordance with the invention, however, additionally supports of the movable knives are arranged counter to each other and are movable independently of each other, inlet and outlet openings for the scrap material to be cut and for the cut pieces of scrap material respectively are aligned with each other, one opening being on one side of the cutting plane of one pair of knives and the other opening being on the remote side of the cutting plane of the other pair of knives and the knife supports are constructed as rams and are arranged to clamp the scrap material between them during cutting.

By selecting the angle between the two cutting planes suitably, the dimensions of the cut pieces of scrap produced can be varied widely solely by altering the distance of advance of the material being cut in between successive cutting operations.

In the machine in accordance with the invention, holding down devices as such, which in existing shearing machines usually require separate drives, become unnecessary. Likewise, there is no need for separate means for advancing the material being cut from one cutting plane into the second plane, because the not yet completely cut material pushes the pieces produced by the first cut ahead of itself into the second cutting plane and also ejects it, when the ram-like knife supports move apart.

The shearing machine in accordance with the present invention can produce, in either one or in both cutting planes, a draw cut if, as is preferred, the co-operating cutting edges of each pair of knives lie at an acute angle to each other in the cutting plane which contains the edges.

Further, it is of substantial advantage, so to arrange the pairs of knives that they operate in a staggered manner, so that at no time does one pair of knives cut simultaneously with the other pair. As a result, the peak loads on the hydraulic drives for the knife supports are reduced.

An example of a scrap shearing machine constructed in accordance with the invention is illustrated in the accompanying drawings, in which.

Figure 1:
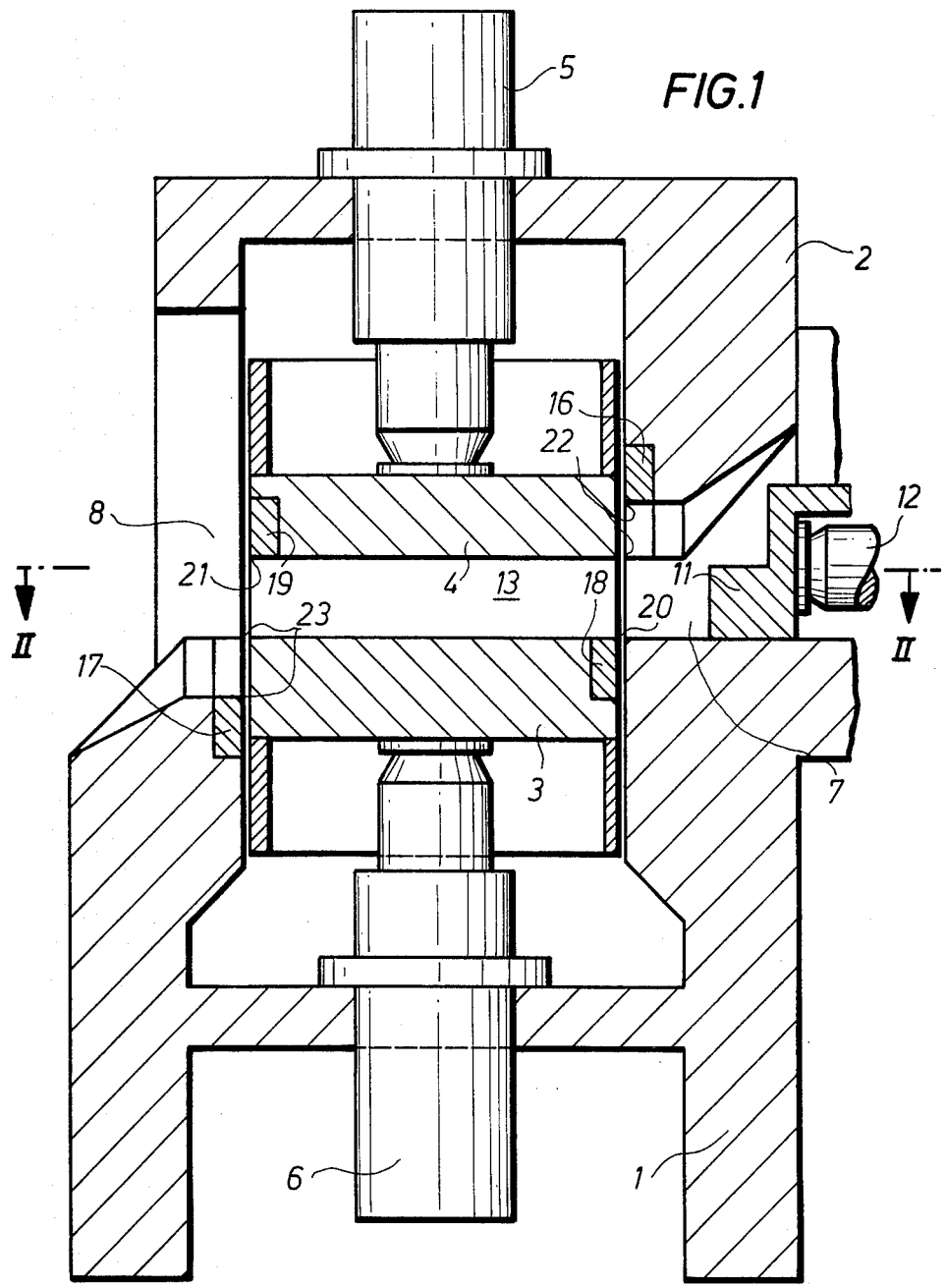
FIG. 1 is a vertical central section through a shear stand of the machine as seen in the direction of the arrows on the line I—I of FIG. 2 with knife supports of the machine in intermediate positions.

The machine shown in FIGS. 1 to 5 comprises a shear stand 1 with a housing 2, in which two knife supports are vertically slidable, namely a lower knife support 3 and counter to this, an upper knife support 4. The knife supports 3 and 4 can be displaced independently of each other by hydraulic drives 5 and 6 which operate under different pressures from each other during cutting so that at any time one knife support pushes the other, more lightly loaded, support ahead of itself by pressure. The supports 3 and 4 form rams and are able to clamp the scrap between them while the scrap is cut.

The walls of the housing 2 are provided with lateral openings 7 and 8, opposite to each other, of which the opening 7 forms an inlet for the material to be cut while the opening 8 forms an outlet for the cut scrap. An opentop feed trough 10, bounded by lateral walls 9, leads into the opening 7. In this trough a pusher 11 is movable, being driven backwards and forwards by a hydraulic drive 12. The feed trough 10 serves for receiving the material to be cut, and this is then pushed by the pusher 11 into the opening 7 and from this opening into the space 13 between the knife supports 3 and 4. The pusher 11 also serves for moving the cut material out through the outlet opening 8.

Figure 2:
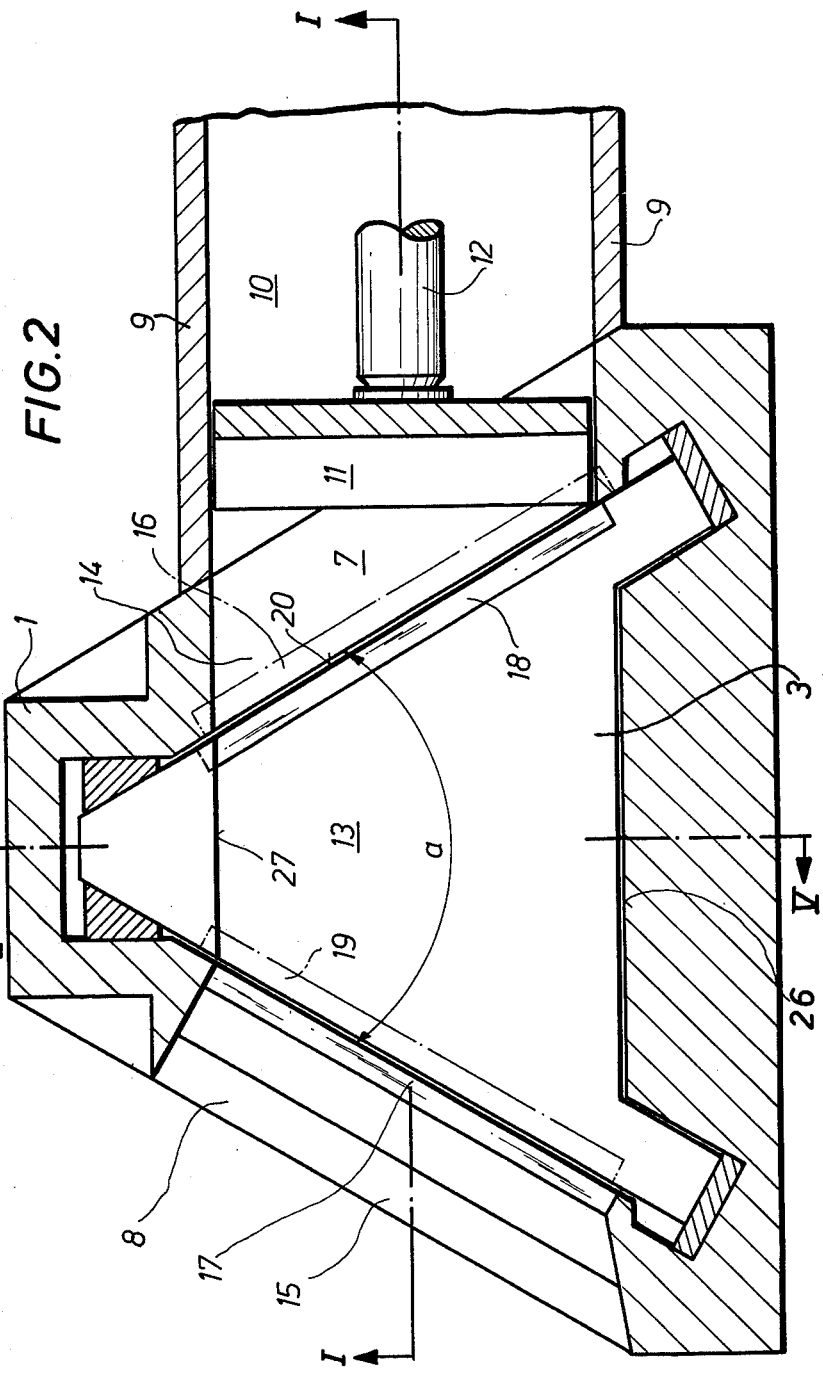
FIG. 2 is a section as seen in the direction of the arrows on the line II—II of FIG. 1 with the knife supports of the machine in intermediate positions.

As shown in FIG. 2, two side walls 14 and 15 of the housing 2 form an angle $a$ between them, preferably of at least 30° and at the greatest 90°. Stationary knives 16 and 17 are set in the side walls 14 and 15, and these knives co-operate with movable knives 18 and 19 which are fixed to the knife supports 3 and 4. The stationary knife 16 co-operates with the lower knife 18 fixed to the knife support 3, and the stationary knife 17 co-operates with the upper knife 19 fixed to the upper knife support 4. The positions of the knives 16 and 19 are shown in chain-dotted lines in FIG. 2. Straight cutting edges 20 and 21 of the movable knives 18 and 19, fixed to the knife supports 3 and 4, extend horizontally. By contrast, cutting edges 22 and 23, which are also straight, of the stationary knives 16 and 17 are inclined, in order to obtain a draw cut. In order to act as holding-down devices, the knife supports 3 and 4 correspond in shape and size to the space 13, and therefore are essentially triangular.

To simplify the illustration as far as possible, it has been assumed for this explanation of the mode of operation that a relatively thick plate 24 (FIG. 6) is being cut into scrap pieces. This plate is pushed by the pusher 11 step by step in the direction V into the space 13. At each advance, the knife supports are in the intermediate position shown in FIG. 1 and thus permit a clear passage for the plate 24.

Figure 3:
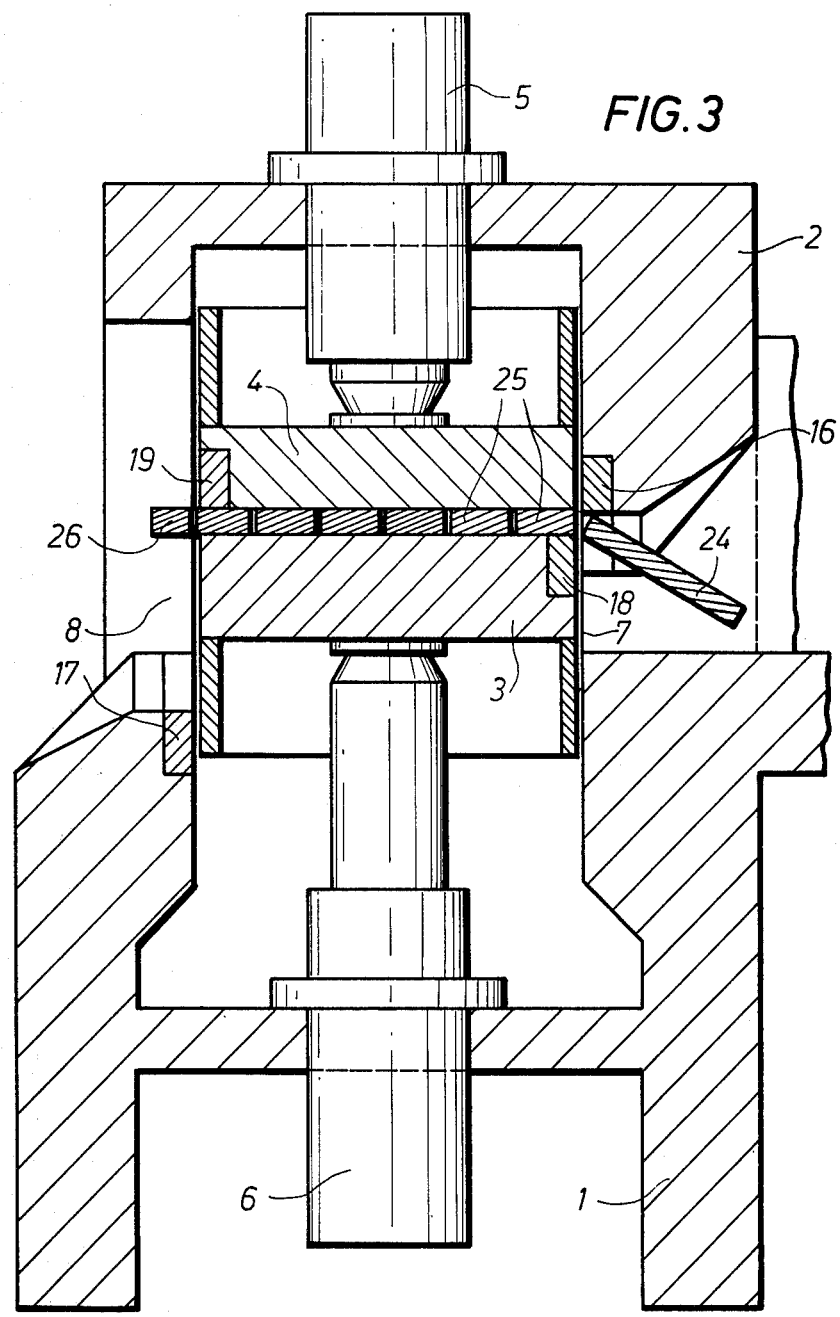
FIG. 3 is a section corresponding to FIG. 1, but with the knife supports raised.
Figure 5:
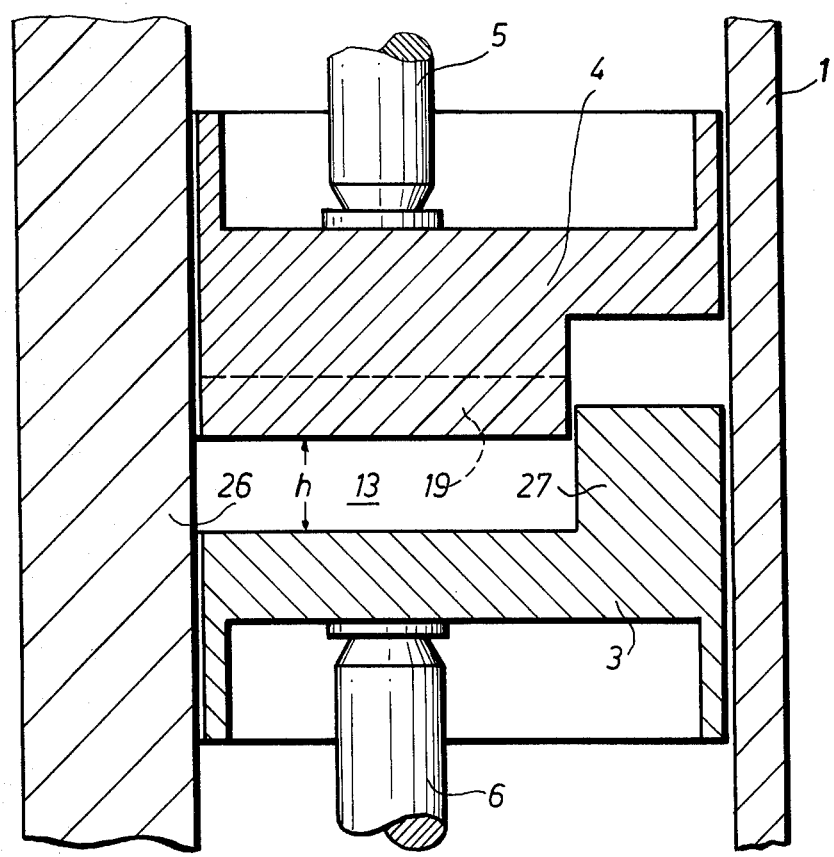
FIG. 5 is a section as seen in the direction of the arrows on the line V—V in FIG. 2 with the knife supports in the positions shown in FIG. 1; and, FIG. 6 is a diagram for explaining the positions of the cuts made in the scrap by the machine.
Figure 6:
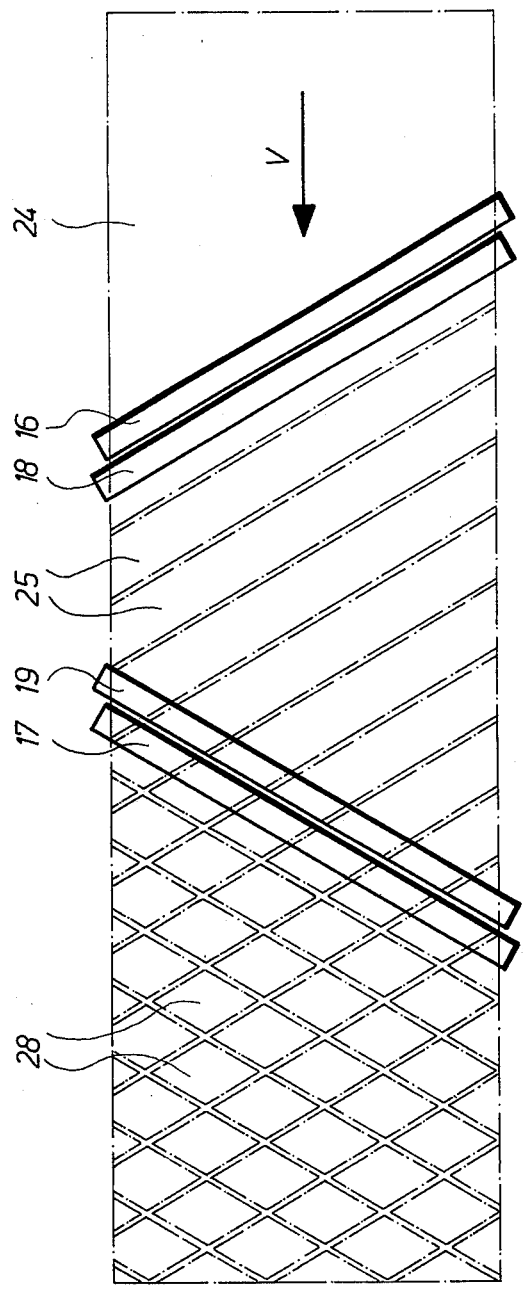

When the plate 24 has been advanced by a distance equal to the predetermined, but adjustable, stroke of the pusher 11, then with the pusher 11 stationary, the lower knife support 3 is first brought into the position shown in FIG. 3, the drive 5 of the knife support 4 being, however, also pressurised, so that the part of the plate 24 between the knife supports 3 and 4 is clamped. So long as the forward end of the plate 24 is still situated within the space 13, only the pair of knives 16, 18 operates and, as the knife support 3 rises, cuts from the plate 24 strips 25 of greater or lesser width, which are at an acute angle to the feed direction V (FIG. 6). After each cut, the knife supports are brought back into the position shown in FIG. 1, so that the feed can be continued again. The cut strips 25 are pushed forward by the succeeding plate 24 or by the following strips 25 already cut in the space 13. In order that the strips 25 inside the space 13 shall retain the direction of advance determined by the feed trough 10 and the pusher 11, guide walls 26 and 27 are provided, as shown in FIGS. 2 and 5, and these extend in height at least over the maximum depth of opening $h$ of the space 13.

Figure 4:
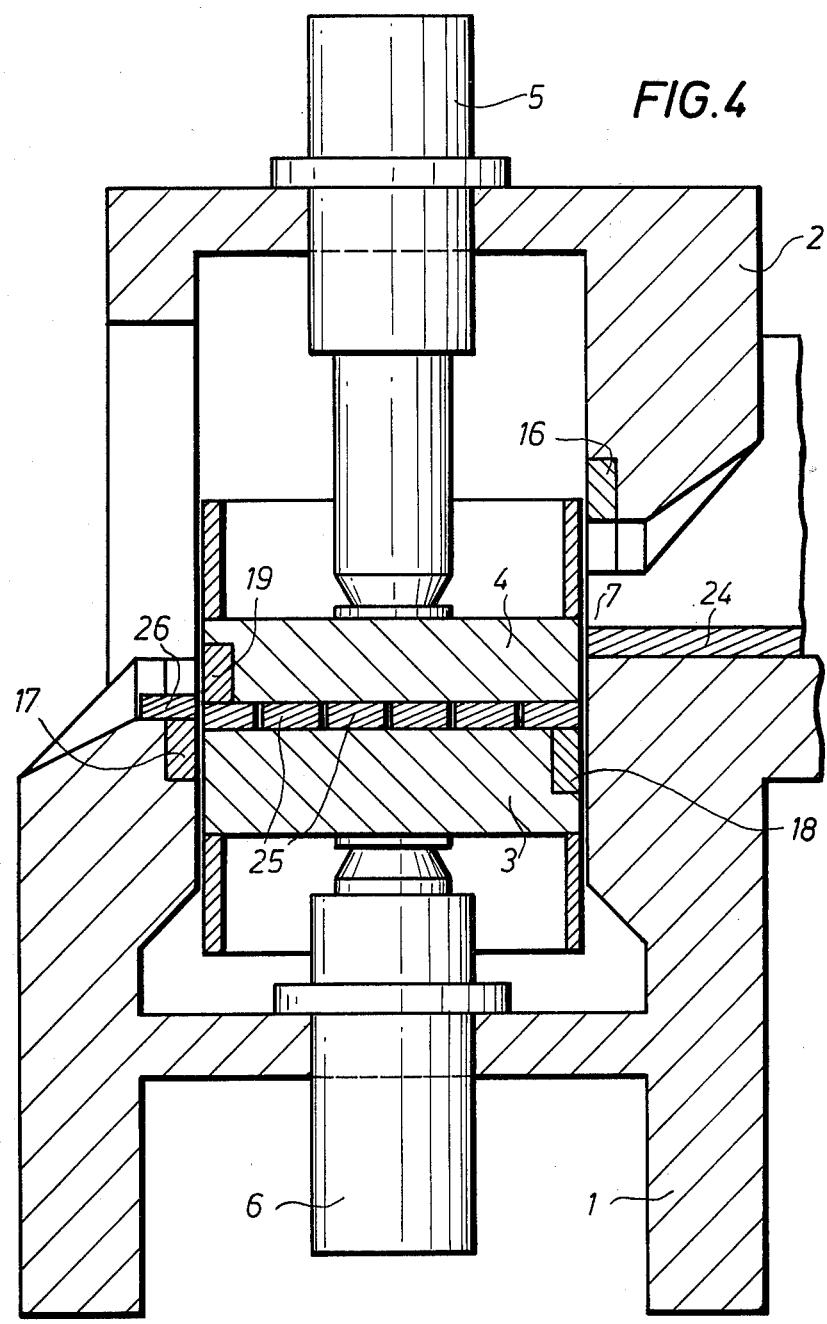
FIG. 4 is a section corresponding to FIG. 1, but with knife supports lowered.

When the strips 25 reach the cutting plane formed by the cutting edges 21 and 23, then these cutting edges come into action and cut up, firstly the first strip 25 and then all the succeeding strips 25, each time the knife supports 3 and 4 descend into the position shown in FIG. 4, cutting the material progressively into pieces having the shape of trapeziums 28.

While the knife 18 cuts upwards with the upper knife support 4 acting as a holding-down device, the reverse is true for the knife 19, which then cuts downwards with the knife support 3 acting as a holding-up device. At each cut, the hydraulic drives 5, 6 of the knife supports 3 and 4 are pressurised, although the pressure acting on the support of the cutting knife is always greater than the pressure acting upon the other knife support which acts as a holder or counter-support.

I claim:

1. In a scrap shearing machine for cutting up platelike scrap material, said machine comprising a first pair of knives and a second pair of knives, said first pair of knives comprising a first movable knife and a first stationary knife and said second pair of knives comprising a second movable knife and a second stationary knife, means operatively mounting said first pair of knives for cutting said scrap material in a first plane and means operatively mounting said second pair of knives for cutting said scrap in a second plane which lies at an angle to said first plane, said first pair of knives and said second pair of knives being adapted to cut said scrap material successively, the improvement comprising a housing, a first support carrying said first movable knife, means movably mounting said first support for cutting movement in said housing, a second support carrying said second movable knife, means mounting said second support for cutting movement in said housing counter to said movement of said first support, means for moving said first support and said second support independently of each other, means defining an inlet opening into said housing for scrap material to be cut, means defining an outlet opening from said housing for cut pieces of said scrap material, said inlet opening being located on one side of said first plane and said outlet opening being located on the remote side of said second plane and said inlet and outlet openings being aligned with each other, and said first support and said second support forming rams which are adapted to clamp said scrap material between them during said cutting movements of said first support and said second support.

2. A machine as claimed in claim 1, whererin said first movable knife and said first stationary knife have cooperating cutting edges and said second movable knife and said second stationary knife have co-operating cutting edges, said cutting edges of said first knives lying at an acute angle to each other in said first plane and said cutting edges of said second knives lying at an acute angle to each other in said second plane.

* * * * *